United States Patent
Conrad et al.

(10) Patent No.: US 9,600,509 B2
(45) Date of Patent: Mar. 21, 2017

(54) SYSTEMS, METHODS, AND SOFTWARE FOR ENTITY RELATIONSHIP RESOLUTION

(75) Inventors: Jack G. Conrad, Eagan, MN (US); Christopher C. Dozier, Minneapolis, MN (US); Sriharsha Veeramachaneni, St. Paul, MN (US)

(73) Assignee: Thomson Reuters Global Resources (CH)

( * ) Notice: Subject to any disclaimer, the term of this patent is extended or adjusted under 35 U.S.C. 154(b) by 561 days.

(21) Appl. No.: 12/341,913

(22) Filed: Dec. 22, 2008

(65) Prior Publication Data

US 2009/0198678 A1    Aug. 6, 2009

Related U.S. Application Data

(60) Provisional application No. 61/008,891, filed on Dec. 21, 2007.

(51) Int. Cl.
*G06F 17/30* (2006.01)
*G06F 7/00* (2006.01)

(52) U.S. Cl.
CPC .. *G06F 17/30345* (2013.01); *G06F 17/30303* (2013.01); *G06F 17/30545* (2013.01)

(58) Field of Classification Search
USPC .......................................................... 707/769
See application file for complete search history.

(56) References Cited

U.S. PATENT DOCUMENTS

| | | | |
|---|---|---|---|
| 5,974,420 A * | 10/1999 | Lehman | G06F 9/544 |
| 6,658,412 B1 | 12/2003 | Jenkins et al. | |
| 7,403,942 B1 * | 7/2008 | Bayliss | G06F 17/30303 707/748 |
| 7,870,151 B2 * | 1/2011 | Mayer | G06F 17/30542 707/780 |
| 2004/0019593 A1 * | 1/2004 | Borthwick | G06F 17/30495 |
| 2004/0267824 A1 * | 12/2004 | Pizzo | G06F 17/30902 |

(Continued)

FOREIGN PATENT DOCUMENTS

WO    WO-2009086311 A1    7/2009

OTHER PUBLICATIONS

"International application serial No. PCT/US2008/088038 search report mailed Jun. 9, 2009".

(Continued)

*Primary Examiner* — Kuen Lu
(74) *Attorney, Agent, or Firm* — Duncan Galloway Egan Greenwald, PLLC; Kevin T. Duncan

(57) ABSTRACT

To facilitate access to public records, the present inventors devised, among other things, an entity resolution system. The exemplary system includes master records database of 300 million entities, which is partitioned into multiple distinct portions. The exemplary system extracts entity information from input public records and constructs one or more blocking queries against specific portions of the master records database to identify one or more sets of candidate records. Feature vectors are defined for the candidate records and machine learning techniques, such as Support Vector Machine, are used to determine which of the candidate records from the master records database match the input public records. Candidate records that match are logically associated with public records, enabling ready access via direct or indirect queries.

20 Claims, 5 Drawing Sheets

(56) References Cited

U.S. PATENT DOCUMENTS

2005/0273346 A1\* 12/2005 Frost ...................... G06Q 30/00
                                                                         705/316
2005/0273453 A1\* 12/2005 Holloran ................ G06Q 10/10
2006/0064271 A1\* 3/2006 Liang ............... G05B 19/41875
                                                                         702/120

OTHER PUBLICATIONS

"International application serial No. PCT/US2008/088038 Written Opinion mailed Jun. 9, 2009".

"International Application Serial No. PCT/US2008/088038, Invitation to Pay additional fees mailed on Mar. 31, 2009", 9 pgs.

Elfeky, M. G, et al., "Tailor: A Record Linkage Toolbox", *Proceedings 18th International Conference on Data Engineering*. vol. 18, (Feb. 26, 2002), 17-28 pgs.

Fair, M. E, "Record Linkage in the National Dose Registry of Canada", *European Journal of Cancer*, Pergamon Press, vol. 33, (Apr. 1, 1997), S37-S43 pgs.

Jordi, N., "On the Use of Semantic Blocking Techniques for Data Cleansing and Integration", *Database Engineering and Applications Symposium*, (Sep. 1, 2007), 190-198 pgs.

\* cited by examiner

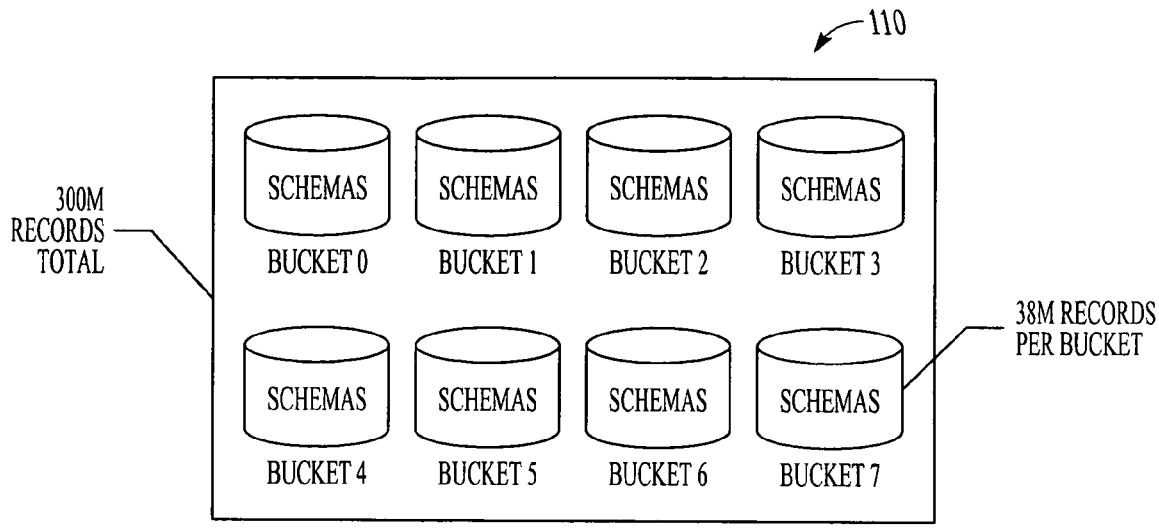

*FIG. 3*

| MRD_NAME_ADDRESSES_LOOKUP TABLE | | |
|---|---|---|
| entity_seq | NUMBER(16) | <k> |
| bucket_number | NUMBER(2) | |
| first_name_first_letter | CHAR(1) | <indexed> |
| first_name | VARCHAR2(32) | <indexed> |
| sur_name | VARCHAR2(32) | <indexed> |
| country_name | VARCHAR2(32) | <indexed> |
| city_name | VARCHAR2(32) | <indexed> |
| state_abbreviation | VARCHAR2(2) | <indexed> |
| country_code | VARCHAR2(2) | <indexed> |
| zip_code | VARCHAR2(5) | <indexed> |

| MRD_NAMES_LOOKUP TABLE | | |
|---|---|---|
| entity_seq | NUMBER(16) | <k> |
| bucket_number | NUMBER(2) | |
| first_name | VARCHAR2(32) | <indexed> |
| middle_name | VARCHAR2(32) | |
| sur_name | VARCHAR2(32) | <indexed> |
| second_sur_name | VARCHAR2(32) | |
| suffix | CHAR(1) | |

*FIG. 4*

SYSTEMS, METHODS, AND SOFTWARE FOR ENTITY RELATIONSHIP RESOLUTION

RELATED APPLICATION

The present application claims priority to U.S. Provisional Application 61/008,891, which was filed on Dec. 21, 2007 and which is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2007, Thomson Reuters Global Resources.

TECHNICAL FIELD

Various embodiments of the present invention concern management and processing of public records data, particularly aggregating and resolving the public records data from multiple sources into a entity relationship database (ERD).

BACKGROUND

The present inventors recognized that there are over three hundred million people living in the United States and there are generally several public record documents for any given individual. Examples of these databases include real estate recordations, birth certificates, death certificates, marriage licenses, hunting and fishing licenses, motor vehicle licenses, etc. Creating a profile based on the publicly available data for any given individual would therefore generally require researching several individual databases. This process of manually searching and collecting data throughout various databases is time consuming and potentially expensive. The problem is further compounded with the added effort to ensure that records from various databases actually refer the given individual rather than someone with the same name.

Accordingly, the present inventors identified a need for improving the accessibility and utility of public records data.

SUMMARY

To address and/or other needs, the present inventors devised, among other things, an systems and methods that are capable of identifying billions of relationships of varying confidence given a highly optimized master record database (MRD). Additionally, the inventors devised a method of validating and normalizing incoming records of the kind typically available in assorted public records databases. Ultimately, these relationships are stored in an entity relationship database (ERD) for direct or indirect querying.

BRIEF DESCRIPTION OF THE DRAWINGS

FIG. 3 is an exemplary portioning structure for an entity resolution database corresponding to one or more embodiments of the present invention.

FIG. 4 is diagram of an exemplary lookup table or data structure corresponding one or more embodiments of the present invention.

DETAILED DESCRIPTION OF EXEMPLARY EMBODIMENTS

This description describes one or more specific embodiments of one or more inventions. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Master Record Database

Figures 1A, 1B:
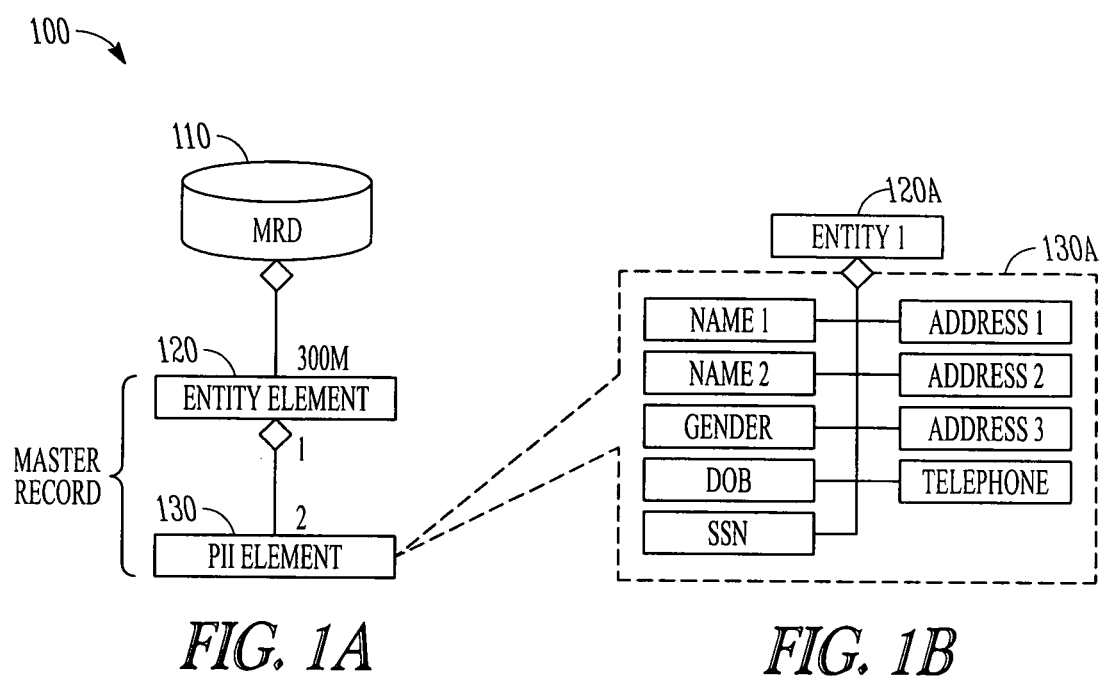
FIGS. 1a, 1b, and 2 are block diagrams of exemplary data structures or database schema corresponding to one or more embodiments of the present invention.

The exemplary ERD (entity resolution database) resolution engine uses a master record database (MRD) 110 to store personal information about persons (or "entities") for the purpose of resolving documents to people. Populated from a trusted source (such as TransUnion©, Experian© commercial data sources), the MRD contains approximately 300 million "master records" representing all entities known to the engine. FIG. 1a shows master record database 110 as having a master record or data structure having a generic entity element 120 and multiple personally identifiable information (PII) elements 130. In the case of the exemplary MRD, this information includes name, address, phone, social security number (SSN), date-of-birth (DOB), date-of-death (DOD), and gender. (Some embodiments may omit one or more of these elements or include other elements.) FIG. 1b shows a specific entity element 120A serving as the anchor for the multiple pieces of specific identification information 130A for an entity. An entity can have multiple names (married name, maiden name, an a.k.a (also known as)), multiple addresses (current, previous), multiple phone numbers, and so on. In the exemplary embodiment, an entity has at least a name and an address to appear in the MRD; however, some embodiments may pose other requirements, such as name and social security number or telephone. PII elements are not shared between entities. There are varying levels of PII element population across the set of 300 million master records.

Figure 2:
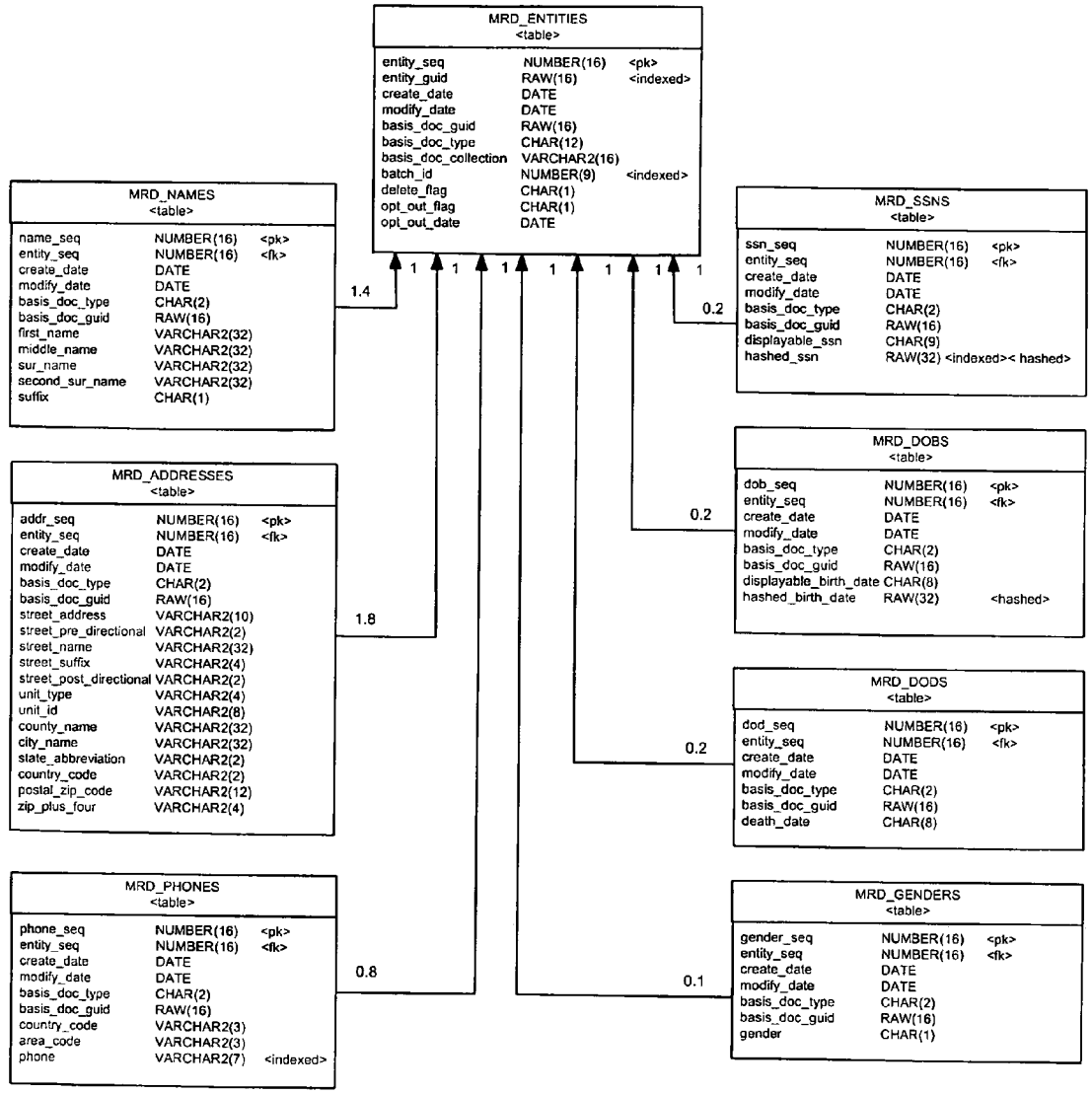

FIG. 2 shows an exemplary detailed schema (or detailed data structure) 200 for master record database 100. Schema 200 includes eight tables: one for entity elements and seven for PII elements. In addition to fields required for storing PII data, there are fields for various pieces of clerical information used to promote operation of the MRD. Fields with the suffix of "guid" store globally unique identifiers. Encoded as 32-character 2 hex representations of unique 128-bit values when appearing in XML form, GUIDs are stored as RAW (16) data types in the MRD and converted to/from strings in the ERD (entity resolution database) Java tier as necessary. Oracle© system generated sequence numbers are used for foreign keys. Note that in the exemplary embodiment SSN and DOB are hashed using the SHA-256 algorithm to comply with PCI security requirements. Clear text, partially redacted displayable versions are also available. Also note that the second_surname field appearing in the schema may be merged with the sur_name field depending on information modeling needs of particular implementations.

FIG. 3 shows that the exemplary embodiment partitions the MRD database 100 into eight schemas or "buckets" utilizing a name hashing technique to allocate master records to buckets based on the primary name for an entity. Since PII elements are not shared between entities, the MRD schema lends itself to a partitioning scheme that splits data across multiple identical database schemas. If partitioned along a data boundary that aligns with typical query patterns, the potential exists to greatly reduce the number of records that must be scanned for queries that go against a single partition. Because six out of the eight possible blocking queries use name information, names provide a reasonable data boundary for partitioning. For a master record with multiple names, the primary name is defined as the first one. When a name-based blocking query is issued, the hash of the sur_name field is used to determine what bucket is queried. By distributing 300 million records across eight buckets, only 38 million records must be scanned for queries that can be constrained to a single bucket.

An entity can have more than one name; therefore, the exemplary embodiment determines what bucket a master record with multiple names is allocated to. The exemplary embodiment also provides that each name also appears in the correct bucket as designated by the hashing scheme. For a given entity, the primary name defines the bucket where the master record resides in its entirety. Additional names are also stored in the permuted names and addresses lookup table in their respective buckets with a "pointer" to where the master record resides. The pointer consists of the bucket number and the primary key of the entity.

Some embodiments employ a further data optimization for blocking queries using name information only. Rather than scanning the MRD_NAMES_ADDRESSES_LOOKUP table, a companion table containing only names was created for these blocking queries to go against. Based on the average number of addresses expected for master records, this reduces the number of rows that must be scanned to one fourth of those present in the MRD_NAMES_ADDRESSES_LOOKUP table. FIG. 4 shows an exemplary lookup table (data structure) 410 have the following structure. While the current name-only blocking query does not require name fields in the MRD_NAMES_LOOKUP table beyond first_name and sur_name, additional name components are included to support future name-only blocking queries.

The primary client of the MRD is a matching algorithm designed to compare documents to master records. The matching algorithm does this by issuing a blocking query with information gleaned from a document and receiving a candidate list of master records in return. If a match is not found in the candidate list, additional queries may be issued and further matching attempts made. The data available in a given document will determine what queries, and in what order they will be employed to generate candidate lists. In order to present a homogenous representation of PII data present in a document for the purposes of querying and matching, a standard data structure for a person-centric identification record (ident) is used. Depending on how many persons appear in a document, multiple idents may be derived from a single document.

Figure 5:
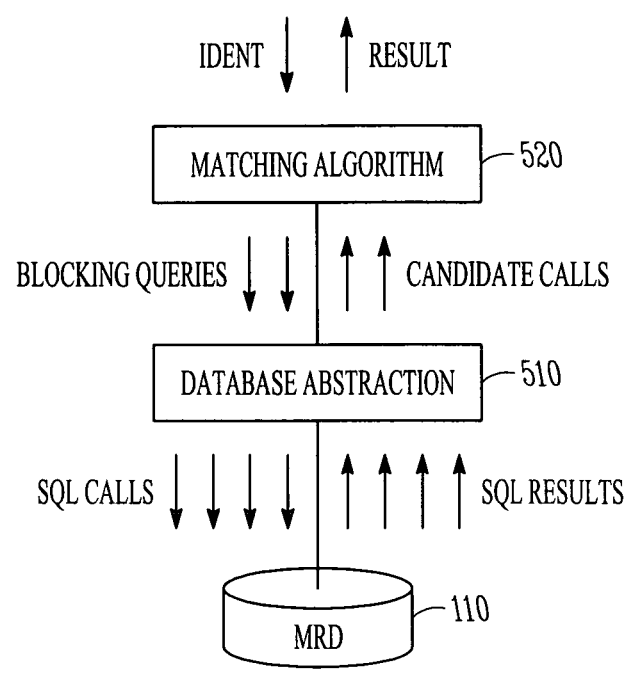
FIG. 5 is an logical diagram of interactions between a matching algorithm and a database abstraction corresponding to one or more embodiments of the present invention.

FIG. 5 shows the logical structure of MRD interactions involving a matching algorithm or module 510 and a database abstraction layer 520. From matching algorithm 510's perspective, idents are the unit of work. For each ident processed, one or more blocking queries are issued based on available information. Depending on how data is organized in the database, a single blocking query may result in multiple database operations. Database abstraction layer 520 is provided to decouple the matching algorithm from the physical data model of MRD 110. It is the responsibility of the abstraction layer to translate between the logical blocking queries issued by the matching algorithm and the SQL calls necessary to carry them out.

The ERD resolution engine executes two distinct but related steps: blocking and matching. Blocking entails dynamically constructing a sequence of queries (run against the MRD) that retrieve the smallest block (or set) of records that contain target records. For example, a SSN query would retrieve a block of size one that contains the target record, while a last name query may retrieve thousands of records. Effective blocking criteria are therefore important to effective performance. Matching entails determining the exact target record within a block and may involve one or more machine learning techniques to identify that target.

Exemplary Method(s)

Figure 6:
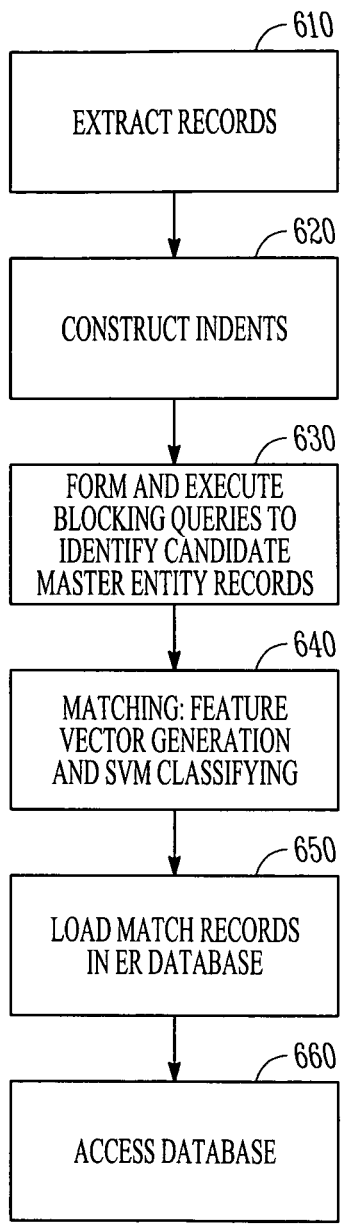
FIG. 6 is a flow chart of an exemplary method of processing public records data which corresponds to one or more embodiments of the present invention.

FIG. 6 is a diagram of an exemplary ERD workflow or method 600. Method 600 includes process blocks 610-660. Note that the processes, functions, and data sets shown and/or described herein are generally stored in a machine readable medium, such as an electronic, optical, magnetic, or ferromagnetic medium, as coded program instructions and/or data. These are used in combination with one or more processors within a single computing or data processing system or within multiple systems that are interlinked, for example via a local or wide-area network.

At block 610, the method begins with record extraction. In the exemplary embodiment, record extractions entails extracting individual records from the public records collections. Execution continues at block 620.

Block 620 entails constructing one or more idents based on the extracted public records. In other words, each of the extracted public records is processed to create one or more person-centric identification records (a.k.a. "idents"), each one consisting of as many of the features described above as are available.

Block 630 entails identifying candidate records from the master records database. In the exemplary embodiment this entails forming and executing one or more blocking queries. For each of the blocking queries listed below, depending on the availability of alternative names, addresses, and phone numbers, a set of query permutations may be created to satisfy each blocking function. These are sequentially submitted to the MRD for sets of candidate records. When one or more records satisfy the matching criteria in terms of $T_{High}$ and $T_{Low}$, the blocking functions terminate.

More particularly in the exemplary embodiment, blocking extracts 'blocks' of candidate records from MRD 110 that satisfy certain query parameters—the goal being to select only those blocks of data that meet certain requirements for further processing (for example, last name matches query AND zip code matches query). Blocking incorporates such parameters to query against so as to generate the smallest possible blocks and thus make subsequent processing more computationally efficient. When a given blocking function does not yield any candidate match, a broader blocking function is tried. An exemplary basic set of features used in conjunction with public records includes: first_name, middle_initial, last_name, street_address, city or county, state, zip_code5, zip_code4, phone_num, DOB, SSN. An exemplary empirically ordered set of blocking queries follows:

(1) SSN
(2) last_name AND first_name AND city_name AND state_abbrev OR last_name AND first_name AND county AND state_abbrev
(3) last_name AND first_name
(4) last_name AND first_name{1} AND zip_code5
(5) phone_num7
(6) last_name AND first_name AND state_abbrev
(7) last_name AND zip_code5

Some other aspects of exemplary blocking relate to query permutations, feature rarity metrics, and short-circuit operations. Regarding query permutations, incoming public records may contain multiple name fields (for example, via a.k.a.), addresses or phone numbers. When this is the case, different "permutations" for the same individual are constructed, each one using a distinct combination of the multiple features that are present in the public record.

Feature Rarity Metrics: In addition to an exemplary plurality of public records features listed above, additional exemplary "rarity" features are constructed from the following combinations, based on their occurrence in the Master Record Database:

(i) last_name AND first_name (freq <= 250)
(ii) last_name AND zip_code5 (freq <= 250)
(iii) last_name AND first_name AND state_abbrev (freq <= 250)

These queries are run only when it is known in advance that the result sets returned are no greater than 250 MRD records. The rarity tables constructed include those combinations that are quite frequent; if a combination appears in the table, then it is not run as a query.

Short-circuit Operations: As an exemplary optimization step, under certain conditions, full-scale matching resources are not invoked on particular blocking result sets. One example is where no further processing is performed and no candidate matches are preserved. This occurs when any of the three blocking query conditions listed above are not satisfied. Again, rarity tables are used to determine whether or not the condition is met. If it is not, no further resources are allocated to process, score, and rank the list of candidates. The second example is where the block consists of just a single candidate match. Given only one candidate that satisfies the blocking query, a simple confirmation via a check of one other piece of evidence, for example DOB, certifies the candidate match. Another example of optimization occurs when a candidate is the only one who matches in the entire region of interest (for example, in city, state, or zip_code).

Once the blocking functions perform their role by identifying limited sets of candidate matches, a more comprehensive and computationally expensive matching takes place. Matching determines the target record within a block which may involve one or more machine learning techniques to identify that target. FIG. 6 shows that after forming and executing the block queries, execution continues at block 640.

Block 640 entails determining whether one or more of the candidate records matches one or more of the public record idents determined at block 620. In the exemplary embodiment, this entails generating a set of one or more feature vectors. In particular, for each "ident permutation-MRD record" pair that results from the blocking result sets, feature vectors are generated by sending the available paired features through a set of feature-specific similarity functions. The resulting feature vector consists of a set of roughly 15 numeric values between 0 and 1. Identically matching features, like last_name and first_name, receive a value of 1.0, while fuzzier matches like "378 Carriage Green Lane" and "3740 Glenridge Grain Blvd" receive scores within the middle of this range. Next, these candidate matches, represented by their feature vectors, are input into an SVM (support vector machine), pre-trained on significant numbers of human judged matches, including both positive and negative examples, for the machine's classification (match/non-match).

Further details of the exemplary SVM-based record matching relate to Similarity Score Calculations, SVM Score to Confidence Rating Conversion, Stopping and Gathering Criteria, Feature Vector Hashing, Special Precision-targeted Similarity Logic, Special Recall-targeted Candidate Match Delivery, and Synthetic Training Data Generation/

Similarity Score Calculations: In general, the functions used to calculate a similarity score between a data field in an incoming public record and the same field in a candidate MRD record returned by a blocking function return a score between 0 (no match) to 1.0 (identical match). The similarity score functions for numeric data fields (for example, zip code, phone number, DOB) were created. The similarity score functions for textual data fields (for example, first name, last name, street address, city or county) were comprehensively researched. Some of the exemplary similarity calculations eventually selected included functions from public domain software provided by the SimMetrics project (http://sourceforge.net/projects/simmetrics/) The current implementation of the ERD SVM is that of SVMLight. In addition, some embodiments use a Java wrapper for the C-based SVMLight which comes from Stanford's Martin Theobald.

SVM Score to Confidence Rating Conversion: Initially all SVM classifier values represent an SVM-specific range of matching scores which vary from below zero to above 1.0. Using a logistic regression-based conversion approach, the distribution curve for the SVM scores is transformed into a confidence rating distribution. For example, an 87% confidence rating would mean that out of 100 instances of such matches, 87 of them would be correctly assigned and 13 would be erroneous.

Stopping and Gathering Criteria: Two thresholds are used during an exemplary matching process, $T_{High}$ and $T_{Low}$, in conjunction with the available blocks. $T_{Low}$, the threshold used as membership criterion, controls how many matches are collected. When the stopping criterion described below is met, then all candidate matches whose confidence rating scores meet or exceed this threshold are gathered and the matching process benefits from the underlying detailed inspection of a SVM classifier. $T_{High}$, the threshold used as stopping criterion, controls how early the matching stops for a given person-centric identification record (a.k.a. "ident"). In a given block, when a confidence rating score meets or exceeds this threshold, no additional blocking functions are invoked and all matches in the current block and previous blocks whose confidence rating scores meet or exceed $T_{Low}$ are collected.

Feature Vector Hashing: A large percentage of the feature vector 'signatures' that are sent to an SVM for classification are actual duplicates of what the machine has seen previously in training. Hence, these vectors along with their classification can be stored in a hash table to speed up processing and classification of these feature vectors.

Special Precision-targeted Similarity Logic: In order to help the SVM classifier better distinguish between the similarity-based feature sets it is sent, certain exemplary decisions are made to help with precision. These exemplary decisions are based on the results from comparative experiments and empirical evidence and resulted in the following optimizations:

(1) Incorporation of binary similarity scores (0 or 1) for certain specific features (for example, SSN and DOB).
(2) Distinguishing between similarity scores generated from two middle names, one middle name and a middle initial, and two middle initials.
(3) Distinguishing between similarity scores generated between two street addresses, a street address and a post box, and two post boxes.
(4) Assigning a partial similarity match score (0.5) for partial features, for example, DOBs including day and month but not year, or month and year but not day.

Special Recall-targeted Candidate Match Delivery: In addition to the high precision resolution engine operations described above, an exemplary embodiment of the present invention may be tuned to deliver 'C' grade match candidates that have not been fully certified by the engine, but would nonetheless be of interest to professional researchers. This task is performed in that instance where a candidate is not found which passes the $T_{High}$ threshold. In these cases, a small set of lower confidence rated candidate matches are delivered to the Entity Relationship Database along with their confidence scores for storage.

Synthetic Training Data Generation: An exemplary training process includes mechanisms that detect gaps in the feature vector space and produce synthetic feature vectors to cover them in a consistent and predictable manner. For example, if a given feature vector with a series of features with reasonably high similarity values is judged to be a non-match by the reviewers, missing feature vectors with lower similarity values for the same features are generated and receive the same "non-match" assignment.

FIG. 6 shows that after completing matching operations at block 650, execution of the exemplary method continues at block 650.

Block 650 entails loading matched records (as determined in block 640) into the Entity Relationship Database (ERD). In some embodiments, this loading entails logically associating the public records corresponding to matched records with the master entity records. Execution continues at block 660.

Block 660 entails accessing the entity relationship database via a client access device. In the exemplary embodiment, the client access device couples to the ERD via local- or wide-area network and submits a query directly to the ERD via a graphical user interface. In some embodiment, a user of the client-access device receives search results including one or more document identifying named persons, which are hyperlinked. Selecting the hyperlink of a particular named entity initiates a query of the ERD for all or some of the publicly records information available through the ERD for the named person.

Other Embodiments

The ERD resolution engine is capable of being extended in a number of ways. In the exemplary embodiment, both records in the MRD and incoming Public Records are person-centric. Other embodiments, however, redeploy the engine to other types of entities, entities such as companies and organizations, or locations, for example. Another example of an extension is the internationalization of the system. Designed into the system is a country field and intl_postal_field which can facilitate processing of non-US-based records. Other types of SVM classifiers (for example, non-polynomial) or other types of machine learning techniques (for example, Bayesian classifiers, Logistic Regression techniques, etc.) could be substituted for the particular SVM configuration used with competitive results

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A system comprising:
   one or more processors;
   an entity resolution database ("ERD") resolution engine adapted to retrieve,
   responsive to a first set of data in one or more data fields in a public record,
   a set of candidate named entity records from a master named entity database based on one of a set of two or more blocking queries,
   wherein each blocking query in the set of two or more blocking queries comprises a query for a last name and a first name, and a city name, all extracted from the public record, and a query for a last name and a first name, all from the public record;
   the ERD resolution engine further adapted to automatically determine a permutation for each blocking query in the set of two or more blocking queries and an order of execution for the set of two or more blocking queries based on the first set of data;
   the ERD resolution engine further adapted to calculate similarity scores for the first set of data in the one or more of the data fields in the public record and a second set of data in a set of data fields in the set of candidate named entity records by comparing the second set of data in the set of data fields in the set of candidate named entity records retrieved by the set of blocking queries with the first set of data in the one or more data fields in the public record; and
   the ERD resolution engine further adapted to determine a confidence rating for one or more of the set of similarity scores between the public record and the candidate named entity record.

2. The system of claim 1, wherein the ERD resolution engine is further adapted to, responsive to the confidence rating, determine whether to retrieve another set of candidate named entity records from the master named entity database based on another of the set of two or more blocking queries.

3. The system of claim 2, wherein the other of the set of two or more blocking queries is broader in scope that the one blocking query.

4. The system of claim 1, wherein the set of blocking queries includes:
   a query for a social security number from the public record;
   a query for a last name and a first name, and a city name, all extracted from the public record; and
   a query for a last name and a first name, all from the public record.

5. The system of claim 4, wherein the system is implemented as a client-server architecture and one or more of the processors is a component of a web server and wherein one or more client access devices interface with the web server via a wide or local area network to request and receive public record information.

6. The system of claim 1 wherein the master named entity database is partitioned into a number of blocks based on corresponding hashes of a name field associated with each record in the master named entity database.

7. The system of claim 1 wherein each similarity score ranges from 0 and 1.0, wherein 0 indicates a non-match and 1.0 indicates an identical match.

8. The system of claim 1 further comprising a lookup table for determining whether one or more of the blocking queries will return a number of candidate named entity records in excess of a threshold.

9. The system of claim 1, wherein one or more of the recited means is implemented using in combination machine-executable instruction sets stored on a machine-readable magnetic, electrical, or optical medium, with the instruction sets executed using one or more processors.

10. A method comprising:
retrieving a set of candidate named entity records from a master named entity database based on one of a set of two or more blocking queries, with each blocking query based on one or more data fields in a public record, and wherein each blocking query comprises a query for a last name and a first name, and a city name, all extracted from the public record, and a query for a last name and a first name, all from the public record, and wherein a permutation for each blocking query in the set of two or more blocking queries and an order of execution for the set of two or more blocking queries is automatically determined based on the one or more data fields in the public record;
calculating similarity scores for one or more of the data fields in the public record and a set of data fields in the set of candidate named entity records by comparing the set of data fields in the set of candidate named entity records retrieved by the set of blocking queries with the one or more data fields in the public record; and
determining a confidence rating for one or more of the set of similarity scores between the public record and the candidate named entity record.

11. The method of claim 10, further comprising: determining whether to retrieve another set of candidate named entity records from the master named entity database based on another of the set of two or more blocking queries.

12. The method of claim 11, wherein the other of the set of two or more blocking queries is broader in scope that the one blocking query.

13. The method of claim 10, wherein the set of blocking queries includes:
a query for a social security number extracted from the public record;
a query for a last name and a first name, and a city name, all extracted from the public record; and
a query for a last name and a first name, all extracted from the public record.

14. The method of claim 10 wherein the master named entity database is partitioned into a number of blocks based on corresponding hashes of a name field associated with each record in the master named entity database.

15. The method of claim 10 wherein each similarity score ranges from 0 and 1.0, wherein 0 indicates a non-match and 1.0 indicates an identical match.

16. The method of claim 10 further comprising:
using a lookup table to determine whether the one of the blocking queries will return a number of candidate named entity records in excess of a threshold.

17. An entity resolution system comprising:
a computer based system comprising an input adapted to receive user-defined inputs, a processor adapted to process executable code and user-defined inputs and a memory adapted to store the executable code and user-defined inputs, the executable code comprising:
a retrieval code set stored on the memory, when executed by the processor, being responsive to a first set of data in one or more data fields in a public record and adapted to retrieve a set of candidate named entity records from a master named entity database based on one of a set of two or more blocking queries, wherein each blocking query in the set of two or more blocking queries includes a query for a last name and a first name, and a city name, all extracted from the public record, and a query for a last name and a first name, all from the public record;
the retrieval set of code further adapted to automatically determine a permutation for each blocking query in the set of two or more blocking queries and an order of execution for the set of two or more blocking queries based on the first set of data;
a matching code set stored on the memory and being adapted to, when executed by the processor, calculate similarity scores for the first set of data in the one or more of the data fields in the public record and a second set of data from a set of data fields in the set of candidate named entity records by comparing the second set of data from the set of data fields in the set of candidate named entity records retrieved by the set of blocking queries with the first set of data from the one or more data fields in the public record; and
a confidence code set stored on the memory and being adapted to, when executed by the processor, determine a confidence rating for one or more of the set of similarity scores between the public record and the candidate named entity record.

18. The system of claim 17, wherein the computer based system further comprises:
a determination code set stored on the memory, when executed by the processor, being responsive to the confidence rating and adapted to determine whether to retrieve another set of candidate named entity records from the master named entity database based on another of the set of two or more blocking queries.

19. The system of claim 17, wherein the set of blocking queries includes:
a query for a social security number from the public record;
a query for a last name and a first name, and a city name, all extracted from the public record; and
a query for a last name and a first name, all from the public record.

20. The system of claim 17, wherein the master named entity database is partitioned into a number of blocks based on corresponding hashes of a name field associated with each record in the master named entity database.

* * * * *